June 9, 1925.
G. D. LUCE
STRIPPER FOR CANE HARVESTERS AND THE LIKE
Original Filed May 12, 1919   2 Sheets-Sheet 2
1,541,231
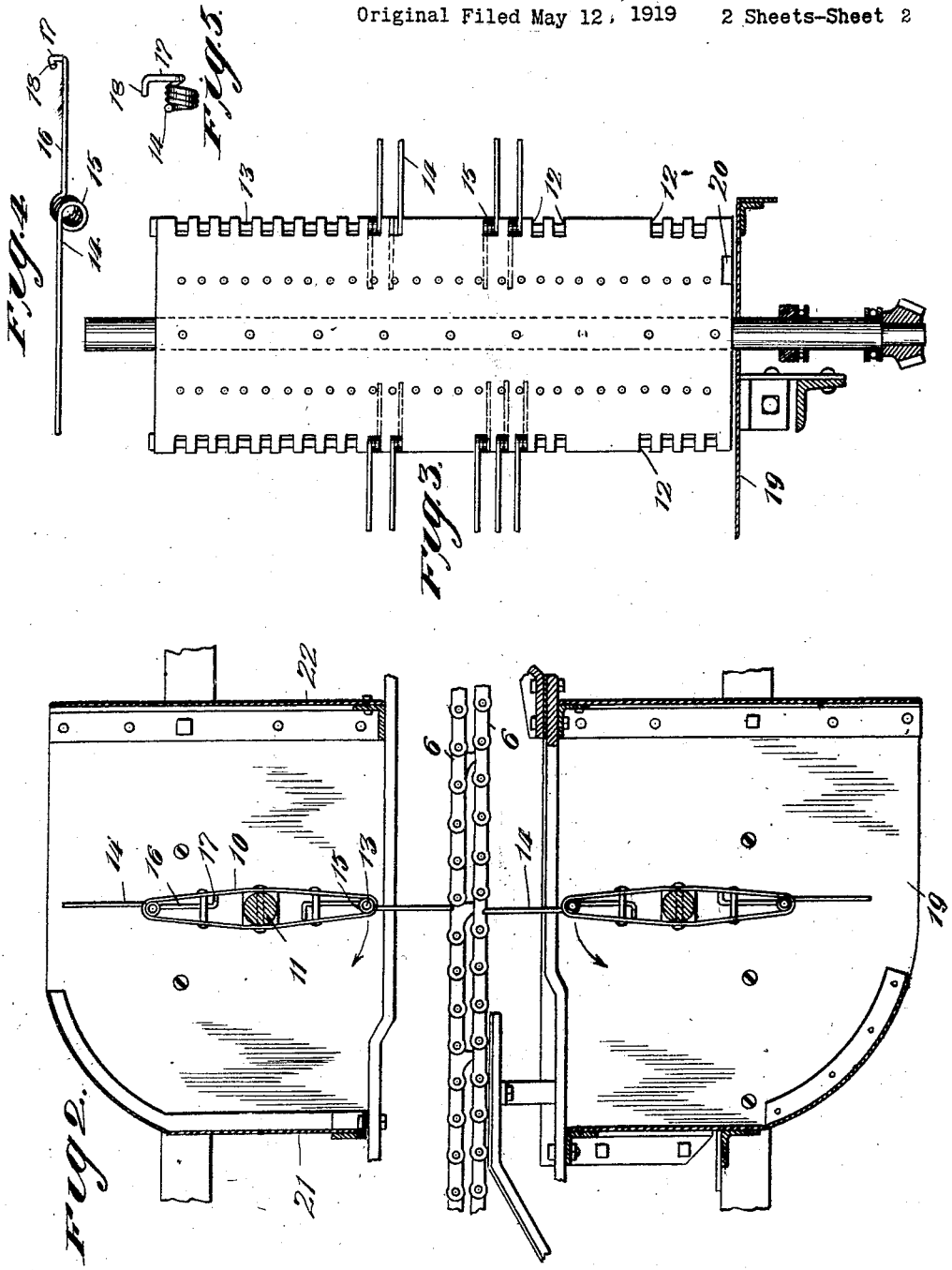
INVENTOR
George D. Luce
BY
Moses, Hammond & Middleton
ATTORNEYS Patented June 9, 1925.

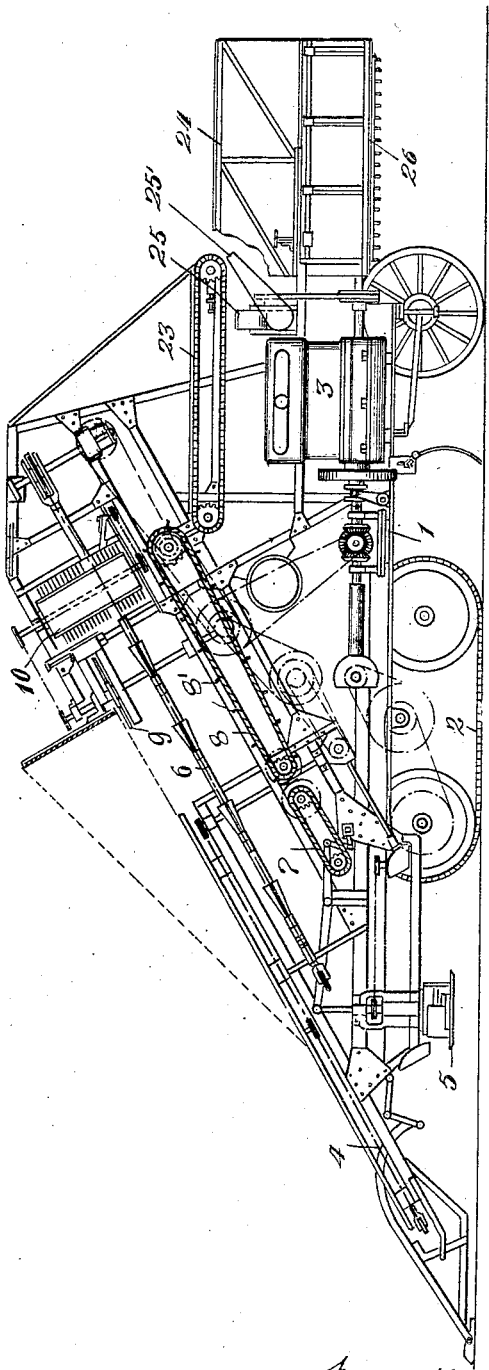

1,541,231

UNITED STATES PATENT OFFICE.

GEORGE D. LUCE, OF WATERTOWN, WISCONSIN, ASSIGNOR TO LUCE CANE HARVESTER CORPORATION, OF NEW YORK, N. Y., A CORPORATION OF DELAWARE.

STRIPPER FOR CANE HARVESTERS AND THE LIKE.

Original application filed May 12, 1919, Serial No. 296,539. Divided and this application filed July 13, 1920. Serial No. 396,004.

*To all whom it may concern:*

Be it known that I, GEORGE D. LUCE, a citizen of the United States, residing at Watertown, county of Jefferson, and State of Wisconsin, have invented certain new and useful Improvements in Strippers for Cane Harvesters and the like, of which the following is a specification.

This invention relates to improvements in apparatus for harvesting sugar cane and the like, and particularly to the means for stripping the cane.

In harvesting cane and preparing it for the mill, the green tops of the cane are removed and the leaves are stripped from the ripe, comparatively stiff portion of the cane from which the sugar is obtained. In accordance with my invention in its preferred form the cane is conveyed past stripping means, while in a substantially upright position, and the leaves are stripped from the cane without injury thereto. Preferably the cane is topped before it reaches the stripping means but this is not essential as the topping may be done at any time. The stripping means embodying my invention, which may be employed in connection with various types of harvesters, is simple in construction, economical to manufacture and efficient and durable in use.

For the purpose of illustrating the invention, I have shown it as applied to a harvester of the form disclosed in my co-pending application, Serial No. 296,539, filed May 12, 1919, of which the present application is a division.

In the accompanying drawings forming part of this specification, and in which I have shown one preferred embodiment of my invention as illustrative of the principle thereof and the best mode now known to me for performing the same, Figure 1 is a view partly in side elevation and partly in longitudinal section and somewhat diagrammatic in character, showing a harvester of the type referred to having the preferred form of the invention applied thereto;

Figure 2 is a sectional plan view of the stripping brushes, brush tables and guards.

Figure 3 is a side elevation of one of the brushes mounted on the brush table, and Figures 4 and 5 are detail views showing the construction of the flexible spring fingers or bristles of the stripping brushes.

Referring to the drawings, the harvester has a frame 1 mounted on the caterpillar tractor treads 2 and is provided with a motor 3 for propelling the apparatus and driving the various mechanisms thereof. At the front of the machine are pick-up chains 4 which gather in the cane and hold it while it is cut close to or below the level of the ground by the rotary disk cutters 5 which are shown in their raised or inoperative positions. When the cane has been severed it is seized between spring pressed conveyor chains 6 which hold the cane firmly and convey it upwardly and rearwardly through the machine. As the cane is thus conveyed, it is tilted into a rearwardly inclined position by the butts of the cane engaging the forward end of a traveling belt or chain 7, the upper run of which travels forwardly and downwardly. This belt or chain serves to detach the dirt which is likely to adhere to the butts of the cane and removes the dirt to prevent it from accumulating in the machine. As the cane is conveyed further through the machine the butts pass out of engagement with the belt or chain 7 and into engagement with the belt or chain 8, the upper run of which travels upwardly and rearwardly in the direction of movement of the cane. The belt or chain 8, which preferably travels at a speed slightly higher than that of the conveyor chains 6, is provided at intervals with raised flights 8' which engage the butts of the cane to prevent the cane from slipping downwardly while passing through the machine. By having the belt or chain 8 travel at a speed slightly higher than that of the conveyor chains 6, snug engagement between the belt or chain 8 and the butts of the cane is assured, and the cane is more or less restored to a vertical position from the rearwardly inclined position into which it was tilted by the traveling belt or chain 7. As the cane is thus conveyed it is preferably topped by suitable devices such as the rotary topping knives 9. The apparatus thus far mentioned is more particularly described in the aforesaid application.

After the cane has been topped, it is carried by the conveyor chains 6 and the belt or chain 8 between the rapidly revolving stripping brushes, the chain or belt 8 serving to cause the cane to assume a more upright position and the flights 8' preventing the cane from slipping during the stripping process. The stripping brushes may be of any suitable construction but are preferably of substantially the form shown in Figures 2 to 5. As here illustrated, each of the brushes comprises a broad substantially flat casing 10 formed of sheet metal and mounted on a shaft 11 the portion of which within the casing is preferably of square cross section so that the casing may be firmly riveted thereto and caused to positively rotate with the shaft. The casing is formed with a plurality of notches 12 along each edge and extending longitudinally inside of each edge is a rod 13. The flexible fingers or bristles 14 of the brush are formed of spring wire, each wire being coiled between its ends into a short helical coil 15 through which the rod 13 is adapted to be passed, thus securing the bristles to the casing. The inner part 16 of the wire is received between the side walls of the casing and thus maintains the outer part of the bristle in an outwardly projecting position. The end of the portion 16 is bent at right angles thereto as indicated at 17, the extreme tip being again bent over as indicated at 18, this last named bent portion being adapted to engage the casing wall and, owing to its shape, preventing the casing from being engaged by a sharp end of the wire which would tend to cut through the same. The coil 15 acts as a spring and permits the wire bristle to yield freely thereby providing great durability. Durability and resiliency are also promoted by the use of a long arm 16 within the casing which engages the casing only at its inner end and may thus yield to assist in taking up the initial shocks when the tips of the wires strike the canes, and also the recoil which occurs when the tips of the wires pass the canes after having been deflected by engagement therewith. The flat hollow construction of the brush casing is valuable as providing for the reception of the bristles in the manner described, and the flat shape is also important because of its fan action when rapidly revolved. By reason of this action it throws or blows the leaves and trash stripped from the case away from the machine and thus not only clears itself from the trash but tends to prevent the trash from falling in or near the machine where it may clog the same or get in the way of the operator. The brushes are positively rotated by power from the motor, a speed of rotation which I have found satisfactory in practice being in the neighborhood of 800 revolutions per minute. The brush shafts 11 are mounted in suitable bearings in the machine and are preferably disposed substantially at right angles to the conveyor drive in vertical planes at each side thereof, so that they occupy a forwardly and upwardly inclined position. Owing to this position and to the substantially vertical or somewhat rearwardly inclined position of the cane as held by the conveyor chains, the brushes act to strip the cane diagonally downward which removes the leaves therefrom most effectively. The brushes preferably rotate in the direction of the arrows shown in Figure 2 so that the movement of the stripping fingers during the stripping operation is in the opposite direction to that of the travel of the cane.

In order to prevent the leaves or trash from wrapping around the brush shafts or getting into the driving gearing each brush is mounted immediately above a brush table 19, the bottom of the brush casing rotating over this table with only a slight clearance. In this way the trash is not able to get under the brush casing or to come in contact with the shaft. As the spring fingers sometimes break, pieces of the rear ends thereof may fall down inside of the casing, and in order to prevent such pieces becoming jammed between the edges of the casing and the table, notches 20 are preferably formed in the back of each wing of the casing to permit any such fragments to be thrown out. The brushes are preferably partly enclosed between the front shields 21 and rear shields 22 which protect the operator from the revolving brushes and also cause the trash to be thrown out laterally through the open spaces between the shields so as to prevent any of the trash being thrown where it will be in the way or where it may get into any other part of the machine.

The topped and stripped cane when released from the conveyor chains may be disposed of in any suitable manner. As shown in Figure 1 the cane falls on a traveling apron 23 which carries it to the rear and drops it into a hopper 24. Any detached leaves or the like are preferably removed from the case before it is deposited in the hopper by suitable means such as a blower 25 having a broad flat nozzle 25' arranged to direct a strong current of air upon the cane as it falls from the apron. The cane is removed from the hopper in any suitable manner as for example by opening the door 26 thereof at will, as described in the aforesaid application.

While I have illustrated and described in detail one preferred embodiment of my invention, it is to be understood that I do not wish to be limited to the precise construction described but that I intend to cover my invention broadly in whatever form its principles may be employed. It is also to be understood that the invention may be used with other forms of apparatus than the particular harvester construction shown.

Having thus described my invention, I claim:

1. In a cane stripper of the character described, a stripping brush comprising a body having wire fingers attached thereto, the wires being formed into coiled springs and being pivoted adjacent to the surface of the body, the inner ends of said fingers being free to move through an angle within said body.

2. In a cane stripper of the character described, a stripping brush comprising a body having projecting fingers connected thereto by spring coils pivoted adjacent the surface of the body with the inner ends of said fingers free to move through an angle within the said body.

3. In a cane stripper of the character described, a stripping brush comprising a body, wire fingers projecting therefrom formed into spring coils pivoted adjacent to the surface of the body with the inner ends of the said fingers free to move through an angle within the body, and rods carried by the surface of the body and extending through the coils for securing the fingers to the body.

4. In a cane stripper of the character described, a stripping brush comprising a body, wire fingers formed into spring coils between their outer and inner ends, and rods carried by the body and extending through said coils, the inner ends of the wires extending inside the body beyond said rod being free to move about the rod as a pivot.

5. In a cane stripper of the character described, a stripping brush comprising a hollow body having openings therein, wire fingers formed into spring coils between their outer and inner ends, said coils fitting in said openings, and rods within the body extending through said coils.

6. In a machine of the character described, a rotary stripping brush comprising a flat shaped body of a length exceeding its width or thickness having spring fingers projecting from the edges thereof.

7. In a machine of the character described, a stripping brush comprising a hollow sheet metal body of a length exceeding its width or thickness of flat shape having rods extending longitudinally along its edges, and stripping elements mounted on said rods.

8. In a machine of the character described, a stripping brush comprising a hollow sheet metal body of a length exceeding its width or thickness of flat shape, having rods extending longitudinally along its edges, and flexible wire fingers or bristles projecting from said edges, said wires being coiled about said rods and the inner ends of the wires extending into the interior of said body.

9. In a machine of the character described, a stripping brush comprising a hollow sheet metal body of flat shape having rods extending longitudinally along its edges, and flexible wire fingers projecting from said edges, said wires being coiled about said rods and the inner ends of the wires extending into the interior of said body, the tips of said inwardly extending portions being bent over to form abutments for engagement with the inner walls of the body.

10. In a machine of the character described, a stripping brush comprising a rotatable shaft and a sheet metal body of flat shape enclosing and attached to said shaft, said body being notched along its edges, rods mounted on the inside of the body edges and extending longitudinally of said edges, and stripping members carried by said rods and projecting through said notches.

11. In a machine of the character described, a stripping brush comprising a rotatable shaft and a sheet metal body of flat shape enclosing and attached to said shaft, said body being notched along its edges, rods mounted on the inside of the body edges and extending longitudinally of said edges, and spring wires projecting outwardly from the edges of the body, said wires being coiled between their ends around said rods and the inner ends of the wires extending a considerable distance inside of the body.

12. A sugar cane stripping brush comprising a flat-shaped hollow sheet metal body of a length exceeding its width or thickness having wire stripping fingers carried thereby, the inner ends of the wires extending into the brush body and being formed with bent portions.

13. A cane stripping brush having a hollow sheet metal body of flat shape provided with outwardly projecting stripping fingers.

14. A finger or bristle for a cane stripping brush, formed of wire and coiled into a spring between its outer and inner ends, one end of said finger being bent at right angles to the said finger and then bent upward substantially parallel to the axis of the coil between the outer and inner ends.

15. A finger or bristle for a cane stripping brush, formed of wire and coiled into a spring between its outer and inner ends, the inner end of the wire being bent twice to form a transverse bearing portion.

16. In a machine of the character described, the combination of means for gripping the cane and conveying it through the machine, traveling means for supporting the butts of the cane, and means for stripping the cane, said means comprising stripping fingers, and means for operating said fingers in planes substantially parallel to the path of the said traveling means.

17. In a machine of the character described, the combination of means for gripping the cane and conveying it through the machine, traveling means for supporting the butts of the cane, means for preventing the butts of the cane from slipping, and means for stripping the cane.

18. In a machine of the character described, the combination of means for gripping the cane and conveying it through the machine, a traveling endless member for engaging the butts of the cane, said member being provided with flights to prevent the cane from slipping, and means for stripping the cane.

19. In a machine of the character described, the combination of traveling endless chains for gripping the cane and conveying it through the machine, a traveling endless member for engaging the butts of the cane, and means for stripping the cane, said means comprising stripping fingers, and means for operating said fingers in planes substantially parallel to the path of the said traveling means.

20. In a machine of the character described, the combination of traveling endless chains for gripping the cane and conveying it through the machine, a traveling endless member for engaging the butts of the cane, said endless member traveling in the same direction as said endless chains, and means for stripping the cane, said means comprising stripping fingers, and means for operating said fingers in planes substantially parallel to the path of the said traveling means.

21. In a machine of the character described, the combination of traveling endless chains for gripping the cane and conveying it through the machine, a traveling endless member for engaging the butts of the cane, said endless member traveling in the same direction as said endless chains and at a higher rate of speed, and means for stripping the cane.

22. In a machine of the character described, the combination of means for conveying the cane through the machine in a standing position, and rotatable stripping brushes having flat-shaped bodies, said brushes being pivoted for rotation about their longitudinal axes and one of said brushes being mounted at each side of the path of travel of the cane.

23. In a machine of the character described, the combination of rearwardly and upwardly inclined conveyor chains for conveying the cane through the machine in a standing position, and rotatable stripping brushes having flat-shaped bodies mounted at each side of the path of travel of the cane, the axes of the brushes being forwardly and upwardly inclined.

24. In a machine of the character described the combination of a rotary stripper arranged to create a draft in the rotation, and a table above which the stripper is mounted, the end of the stripper rotating close to the surface of the table.

25. In a machine of the character described, a rotary stripper having a flat-shaped body and a table beneath the stripper, the end of the stripper body rotating close to the surface of the table.

26. In a machine of the character described the combination of conveyor chains for carrying the cane through the machine in a standing position, rotary strippers mounted on each side of the chains, said strippers being shaped to create draft in their rotation, and tables beneath the strippers, the lower ends of the strippers rotating close to the surfaces of the tables.

27. In a machine of the character described the combination of conveyor chains for carrying the cane through the machine in a standing position, rotary strippers mounted on each side of the chains, tables beneath the strippers, the lower ends of the strippers rotating close to the surfaces of the tables, and stripper guards extending upwardly from the tables adjacent to the strippers.

28. In a machine of the character described the combination of conveyor chains for carrying the cane through the machine in a standing position, rotary strippers mounted on each side of the chains, tables beneath the strippers, the lower ends of the strippers rotating close to the surfaces of the tables, and stripper guards extending upwardly from the tables adjacent to the strippers, said stripper guards being located at the front and rear of the strippers and having openings between them for the discharge of trash.

29. In a machine of the character described, the combination with a rotary stripping brush comprising a hollow sheet metal body having spring fingers projecting therefrom, of a brush table mounted closely beneath said body, said body having a clearance notch in its lower edge adjacent to said table.

30. In a machine of the character described the combination of means for topping and stripping the cane, and separate means for separating the loose trash from the cane after it has been topped and stripped.

31. In a machine of the character described the combination of topping and stripping devices, means for conveying the cane past the topping and stripping devices, and means for separating loose trash from the cane after it is released by said conveying means.

32. In a machine of the character described the combination of topping and stripping devices, means for conveying the cane past the topping and stripping devices, and means for directing a current of air upon the cane after it is released by the conveying means for separating the loose trash from the cane.

33. In a machine of the class described the combination of topping and stripping devices, means for conveying the cane to an elevated position from which the cane falls when discharged by the conveying means, and means for directing a current of air upon the falling cane.

GEORGE D. LUCE.